United States Patent
Grotjohn et al.

(10) Patent No.: US 8,127,240 B2
(45) Date of Patent: Feb. 28, 2012

(54) SEAMLESS DRAG AND DROP OPERATION WITH MULTIPLE EVENT HANDLERS

(75) Inventors: David K. Grotjohn, Cary, NC (US);
Frank L. Jania, Chapel Hill, NC (US);
Jessica W. Ramirez, Danbury, CT (US);
Josef Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/099,796

(22) Filed: Apr. 9, 2008

(65) Prior Publication Data

US 2009/0259959 A1    Oct. 15, 2009

(51) Int. Cl.
*G06F 3/048* (2006.01)

(52) U.S. Cl. ........................................ 715/769

(58) Field of Classification Search .................. 715/769, 715/775, 835, 837, 853

See application file for complete search history.

(56) References Cited

U.S. PATENT DOCUMENTS

| | | | |
|---|---|---|---|
| 5,428,734 A | 6/1995 | Haynes et al. | |
| 7,712,037 B2 * | 5/2010 | Conrad et al. | 715/769 |
| 2007/0234226 A1 * | 10/2007 | Szeto | 715/769 |

* cited by examiner

*Primary Examiner* — Thanh Vu
(74) *Attorney, Agent, or Firm* — Cuenot, Forsythe & Kim, LLC (57) ABSTRACT

A computer-implemented method of selecting event handlers can include initiating a drag and drop operation for a source object and, responsive to detecting contact between the source object and a window of a graphical user interface (GUI), displaying a plurality of icons, wherein each icon represents an event handler for a drop target within the window. The method can include detecting contact between the source object and at least one of the plurality of icons while dragging the object, designating each event handler associated with a contacted icon to process the source object, and responsive to dropping the source object onto the drop target, invoking each designated event handler to process the source object for the drop target. Each designated event handler can output a process result.

20 Claims, 5 Drawing Sheets

SEAMLESS DRAG AND DROP OPERATION WITH MULTIPLE EVENT HANDLERS

FIELD OF THE INVENTION

The embodiments of the present invention relate to drag and drop operations and, more particularly, to a method of selecting event handlers through the use of drag and drop operations.

BACKGROUND OF THE INVENTION

Open application programming interfaces (APIs) allow third parties to design application plugins which interact with a host application though a standard interface. An application plugin is a computer program that functions within an environment provided by the host application to provide new features to the host application or to expand an existing feature. Plugins can create capabilities that extend the host application or support unforeseen future capabilities. For example, the plugin can allow a host Web browsing application to display a form of digital media not otherwise viewable with the host Web browsing application.

As plugin architectures continue to proliferate, situations can arise in which more than one plugin available within the host application is able to handle a same processing function. In instances where multiple plugins may implement the same function, it may be necessary for the host application to designate which plugin will carry out the function.

When multiple plugins are available to operate on an object, the host application may automatically select the plugin to operate on the object. This can lead to a less than optimal choice of plugin. In another approach, the host application may present a list of plugins and request the user to select a preferred plugin to operate on the object. This approach can result in multiple user actions that interrupt user workflow and disturb the continuous flow of the host application.

BRIEF SUMMARY OF THE INVENTION

The embodiments disclosed herein relate to seamlessly selecting an event handler for processing an object within a host application. One embodiment of the present invention can include a computer-implemented method of selecting an event handler. The method can include initiating a drag and drop operation for a source object and, responsive to detecting contact between the source object and a window of a graphical user interface (GUI), displaying a plurality of icons, wherein each icon represents an event handler for a drop target within the window. The method further can include detecting contact between the source object and at least one of the plurality of icons while dragging the object, designating each event handler associated with a contacted icon to process the source object, and responsive to dropping the source object onto the drop target, invoking each designated event handler to process the source object for the drop target. Each designated event handler can output a process result.

Another embodiment of the present invention can include a computer-implemented method of selecting an event handler including initiating a drag and drop operation by dragging a source object and contacting a window of a GUI including a parent node that is not a drop target. The method can include, responsive to selecting the parent node in the window as part of the drag and drop operation, expanding the parent node to reveal at least one child node that is a drop target, identifying a plurality of event handlers associated with each child node that process objects of a same type as the source object, and presenting icons associated with each identified event handler. Responsive to detecting contact between the source object and at least one of the plurality of icons, each event handler associated with a contacted icon can be designated to process the source object. Responsive to dropping the source object onto the child node, each designated event handler can be invoked to process the source object for the child node. Each designated event handler can output a process result.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices such as, for example, keyboards, displays, pointing devices, etc. can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments disclosed herein, a user can select an object upon which to initiate a drag and drop operation. As used herein, the term "object" can refer to any type of programmatic material such as a folder, a file, a section of a file, a container, a program, a section of code, or the like that can be selected and dragged within the context of the drag and drop operation, or otherwise manipulated by a pointing device. For example, the object can be any item that can be individually selected and manipulated. This can include shapes and pictures that appear on a display screen and represent programmatic material stored in a data processing system. An object can include data or procedures or both. In object-oriented programming, for example, an object can be a self-contained entity that can include both data and procedures to manipulate the data.

The selected object can be dragged over a window of a graphical user interface (GUI) of a host application. Upon detecting contact between the object and the window, icons representing each of a plurality of event handlers can be presented. Each of the event handlers can be capable of processing an object of a same type as the dragged object. Continuing the drag and drop operation, the user can contact at least one of the presented icons with the object, designating each event handler associated with a contacted icon as an event handler to process the dragged object. The user can drop the dragged object on a selected drop target in the window, invoking the event handler to process the dropped object, and outputting a process result.

Figure 1:
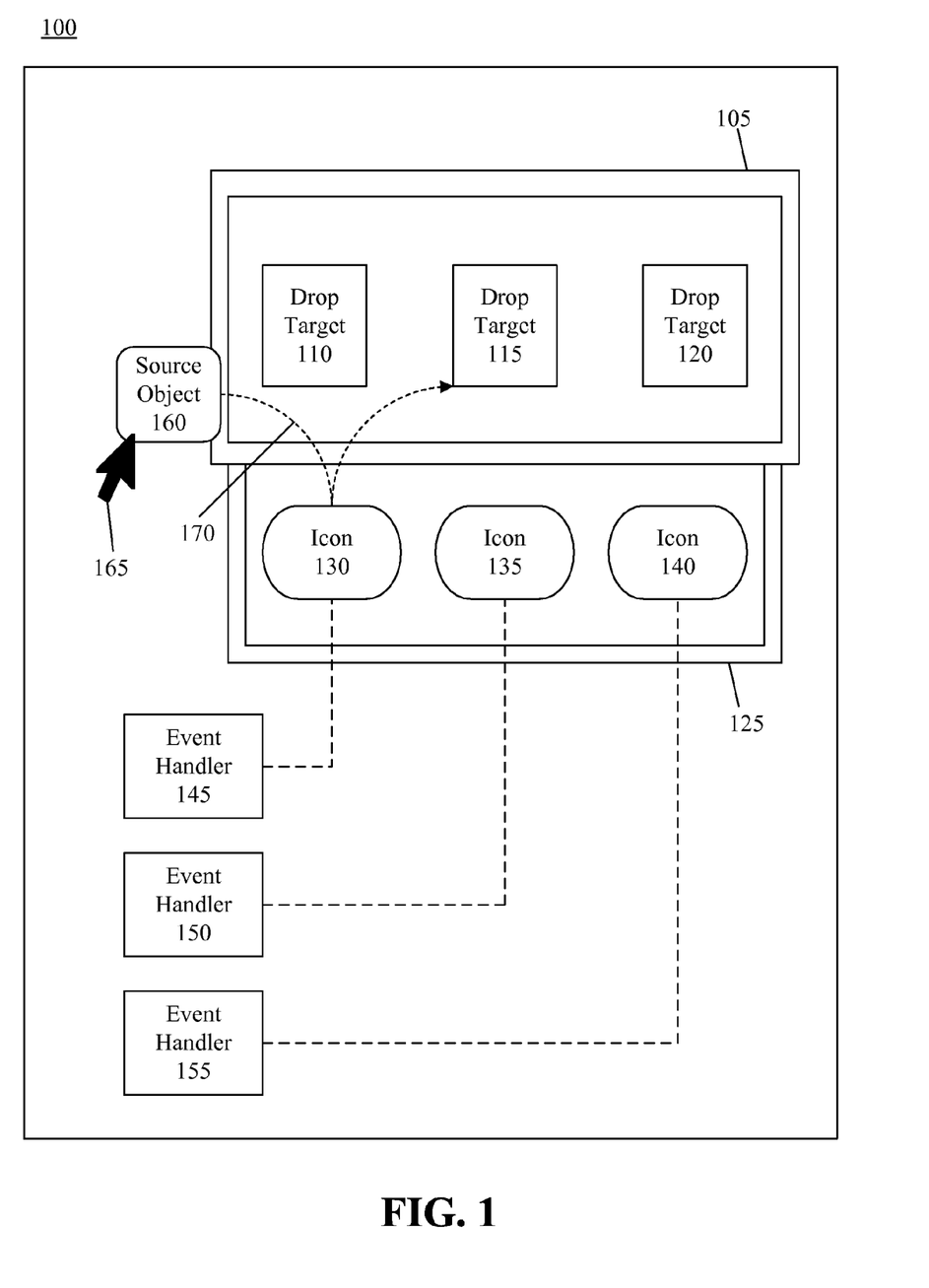
FIG. 1 is a first pictorial view illustrating a technique for selecting an event handler in accordance with one embodiment of the present invention.

FIG. 1 is a first pictorial view illustrating a technique for selecting an event handler in accordance with one embodiment of the present invention. As shown, FIG. 1 depicts a GUI 105 for a host application 100. The phrase "host application," as used herein, can refer to any form of computer program capable of "hosting" or enabling the operation of one or more event handlers. The host application 100 can provide an architecture and/or execution environment within which the event handler can be registered and execute. Accordingly, the host application 100 can communicate with, and invoke, the event handler. Examples of host applications can include, but are not limited to, Web browsers, electronic mail clients, media players, software development tools, instant messaging (IM) clients, data processing tools, and the like.

GUI 105 can present a plurality of drop targets 110, 115, and 120. As used herein, a "drop target" can refer to an object upon which another object may be dropped. For example, a drop target can be an object that can receive another object, e.g., a folder or a function that takes a dropped object as input. In addition, GUI 105 can dynamically display a window 125, responsive to detecting a particular type of event. Window 125 can contain a plurality of icons 130, 135, and 140. As demonstrated by the dotted connecting lines, each of the icons 130, 135, 140 can correspond to a respective event handler 145, 150, and 155. Each of the event handlers 145-155 can require a host application, such as host application 100, for a framework within which to execute. For example, a media player can be an event handler that operates within a host Web browser application. Responsive to the Web browser downloading a file type processed by the media player, the media player can be invoked to process the file.

As used herein, the term "icon" can refer to a targetable area or defined spatial area of a GUI. The various objects described herein, e.g., source object or drop targets, may be represented by icons. Each icon, defining a targetable area of the GUI, typically is formed using a graphic, text, or a combination of both a graphic and text. As an icon representing a parent node in a hierarchy is expanded, for example, the space corresponding to the parent node, or icon representing the node, can be expanded to reveal further defined spaces represented as child icons.

In operation, a source object 160 can be selected with a pointing device 165 and dragged over GUI 105. The phrase "source object" will be used within this specification to refer to the object that is being dragged. Source object 160 can be a portion of programming code, a data file, an image file, a universal resource locator (URL), a video file, or other item that can be represented as an icon and selected for a drag and drop operation. During the drag operation, source object 160 can contact GUI 105. Responsive to detecting contact between source object 160 and GUI 105, the host application 100 can dynamically display window 125 containing icons 130-140.

Throughout this specification, contact will be described in terms of contact between the source object 160 and the contacted object. It should be appreciated, however, that the term "contact" can also refer to contact between the pointer 165 and the contacted object when pointer 165 is dragging a source object. In any case, contact can refer to the case when two objects overlap one another, when an edge of each object touches the other, or when an edge of one object crosses an edge or boundary of another object. In another aspect, contact can refer to one object entering a geographical area surrounding GUI 105, e.g., an area extending outward from each border or edge of GUI 105 in one or more or all directions for a predetermined distance. Contact between GUI 105, or a window within GUI 105, and source object 160 can be the event that causes window 125 to be displayed.

In one embodiment, upon detecting contact between source object 160 and GUI 105, the host application 100, e.g., the GUI 105, can execute a query to determine which event handlers, of a plurality of event handlers of the host application 100 are capable of processing source object 160. The query can determine a type of source object 160 and the event handlers available to the host application 100 that process objects of the same type as the source object 160. In doing so, the host application 100 further can determine that more than one event handler is available for processing objects of the type of source object 160. The type of an object can be indicated by the particular file extension of the source object 160. Upon identifying event handlers capable of processing the source object 160, the host application 100 can display only icons corresponding to the identified event handlers, in this case icons 130-140 corresponding to event handlers 145-155.

Within GUI 105, event handlers 145-155 are represented as icons 130-140 within window 125. It should be appreciated, however, that icons 130-140 may be presented in any number of ways. In one embodiment, the icons can be displayed floating over GUI 105. For example, icons 130-140 can be displayed as a semi-transparent overlay with the underlying GUI 105 still being viewable beneath icons 130-140. In another embodiment, the icons 130-140 can be presented in a menu form, spaced so as to allow a pointer dragging source object 160 to traverse a path to select one or more event handlers during the drag and drop operation to be described herein. The particular manner in which icons 130-140 are displayed is not intended to limit the embodiments disclosed herein of the invention so long as icons 130-140 are dynamically displayed responsive to an event as described.

Once icons 130-140 are displayed, the user can continue the drag operation, dragging source object 160 along a path 170. Traversing path 170, source object 160 can contact or pass over icon 130, designating event handler 145 associated with icon 130 to process source object 160. Completing path 170, source object 160 can be moved over drop target 115 and released. Upon releasing source object 160, which terminates the drag and drop operation, the host application 100 can invoke event handler 145 to process source object 160.

In this manner, the user can select source object 160 and drag source object 160 to GUI 105 of the host application 100. Icons 130-140, which are associated with event handlers 145-155 for processing objects of the same type as source object 160, can be dynamically displayed responsive to the contact. An event handler to process source object 160 can be designated. Source object 160 can be dropped on drop target 115. These steps can be performed in one continuous and uninterrupted drag and drop operation, resulting in the invocation of event handler 145.

Figure 2:
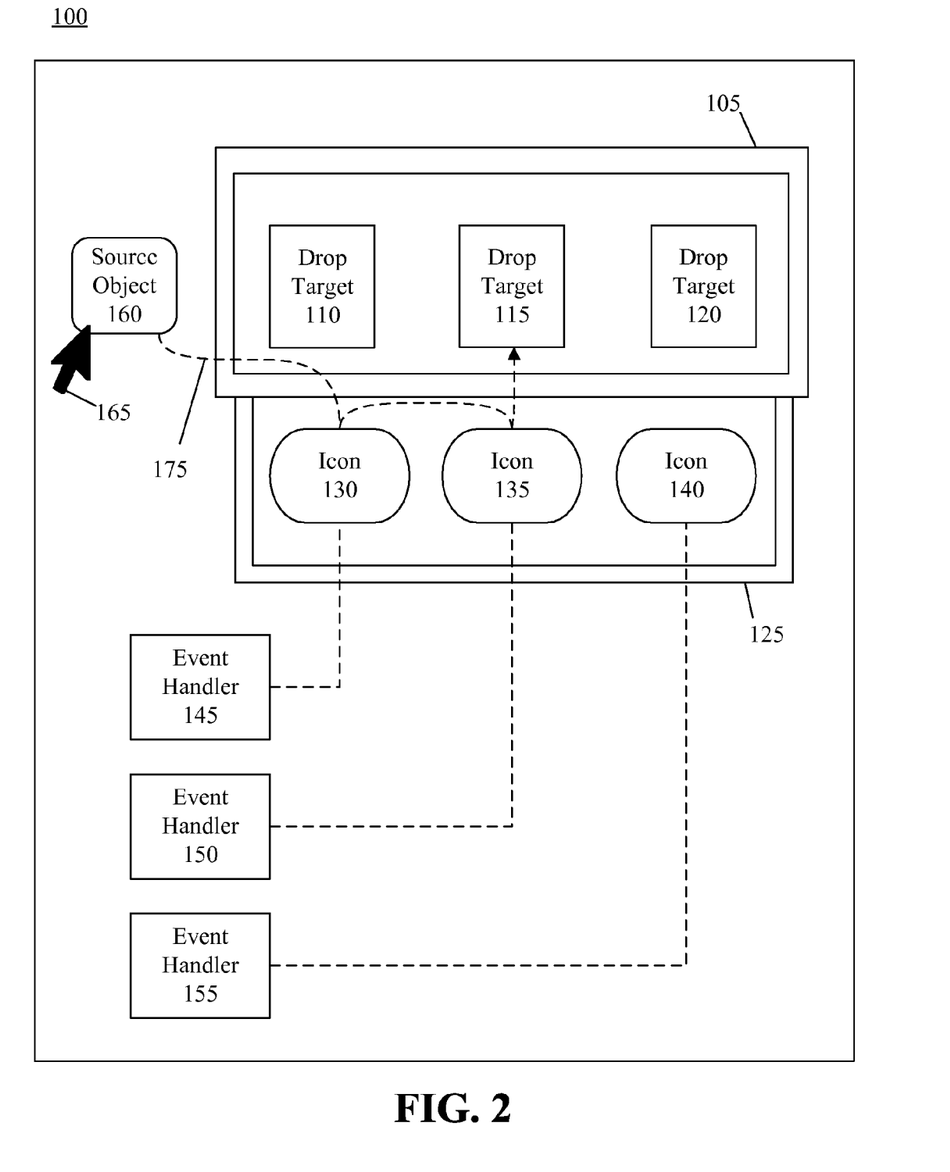
FIG. 2 is a second pictorial view illustrating a technique for selecting a plurality of event handlers in accordance with another embodiment of the present invention.

FIG. 2 is a second pictorial view illustrating a technique for selecting a plurality of event handlers in accordance with another embodiment of the present invention. FIG. 2 illustrates another example of a continuous drag and drop operation selecting a plurality of event handlers using the GUI 105 of host application 100. FIG. 2 demonstrates how multiple event handlers can be selected to process a single source object.

As shown, source object 160 has been selected and is being dragged via pointer 165. Path 175 represents the route along which source object 160 is dragged during the drag and drop operation. Responsive to contact between GUI 105 and source object 160, window 125 can be displayed. Using pointing device 165, source object 160 can be dragged to contact both icon 130 and icon 135 before being released over drop target 115. Responsive to contact between source object 160 and icons 130 and 135, event handler 145, associated with icon 130, and event handler 150, associated with icon 135, can be designated to process source object 160. In response to source object 160 being released over drop target 115, the two designated event handlers 145 and 150 can be invoked to process source object 160. As source object 160 made no contact with icon 140, event handler 155 is not selected or invoked.

The ability to designate multiple event handlers to process source object 160 can be helpful when multiple features are available to the host application 100 to process a single object type. For example, the user may select and drag a URL specifying a unique media type and drop the URL into a browser type of host application. The browser may have multiple event handlers available to process URL type objects. Upon dragging the URL over the browser GUI, all available event handlers for processing URL type objects can be displayed as icons.

The user can drag the URL over any icons representing available event handlers to select the event handlers the user wishes to invoke. One event handler, for example, can perform bookmark management, while another event handler may display the media file indicated by the URL. The user can drop the URL in the browser, e.g., over the drop target. If the user contacts the source object 160 with the icon for the bookmark management event handler and the icon for the URL display event handler, responsive to the drop, the bookmark management event handler can be invoked and the display event handler can be invoked. In one embodiment, each event handler can be invoked in the order that the corresponding icons were contacted. The bookmark management event handler can store the bookmark in a particular location, e.g., a folder indicated by or associated with the drop target. The display event handler can render the media file indicated by the URL. In this way, multiple event handlers can be invoked to process the URL in a single drag and drop operation.

Figure 3:
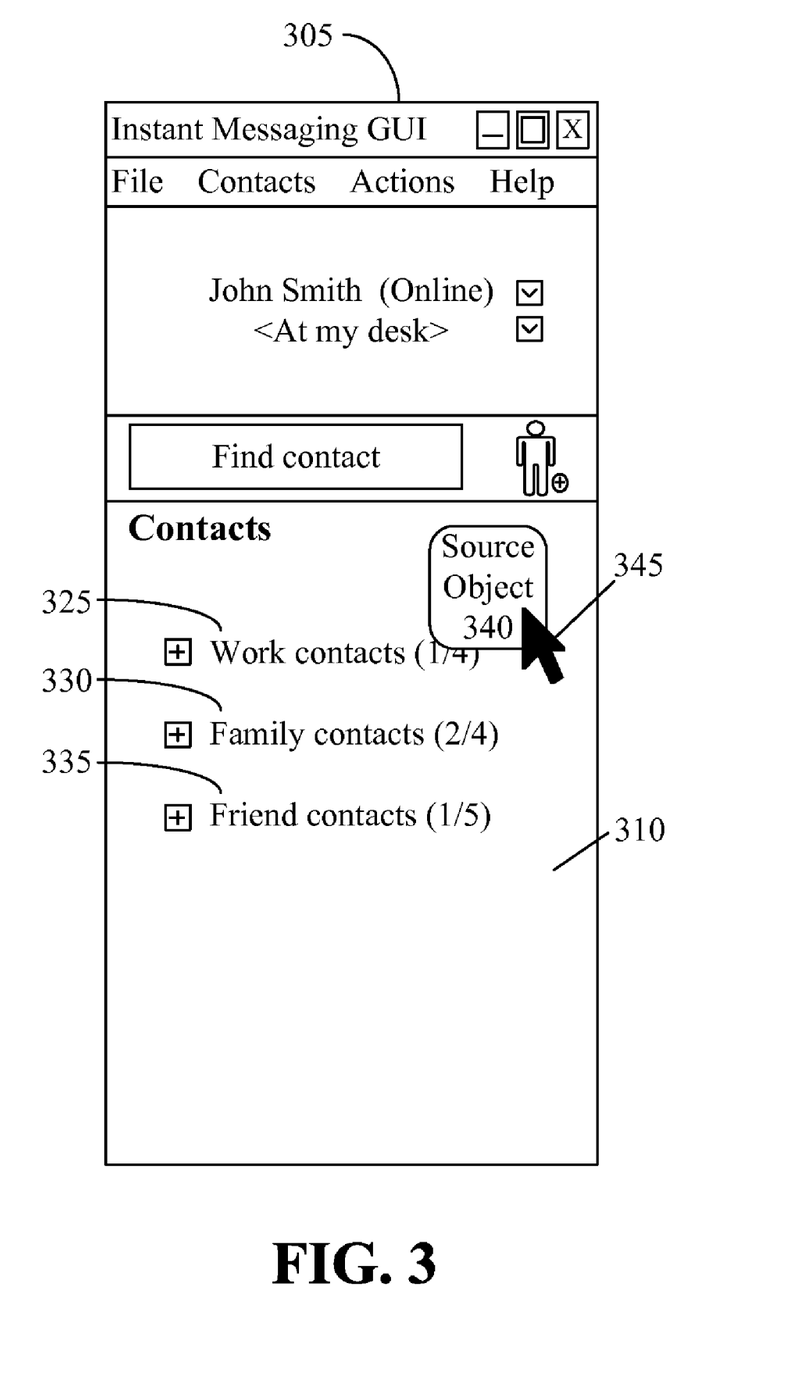
FIG. 3 is a third pictorial view illustrating a technique for selecting an event handler in accordance with another embodiment of the present invention.

FIG. 3 is a third pictorial view illustrating a technique for selecting an event handler in accordance with another embodiment of the present invention. FIG. 3 shows a GUI 305 for an instant messaging (IM) client type of host application. The IM client can include several event handlers. The GUI 305 can include a window 310, which presents a contact list, e.g., a buddy list. The contact list can be hierarchical in nature as indicated by expandable nodes 325, 330, and 335, each functioning as a parent node. For purposes of illustration, contacts of the host application as may be presented within window 310 can serve as drop targets for the source object 340 being dragged.

In operation, the user can select a source object 340, which in this example can be a URL, with a pointer 345. As source object 340 contacts window 310, window 310, for example a container within GUI 305, can initiate a query to determine whether any drop targets for source object 340 exist or are shown within window 310. For example, window 310, as is known in the art, can be a container object including the logic necessary for identifying, querying, and otherwise interacting with any objects presented within window 310.

In this case, the query can determine that window 310 includes nodes 325, 330, and 335. Each of nodes 325-330, as noted, is a parent node which may have zero or child nodes. In this example, each of nodes 325-330 can serve as a class or category that includes other objects, e.g., contacts. As such, nodes 325-330 are not considered drop targets. In this example, since no drop targets are displayed within window 310, no event handlers, or icons representing event handlers, will be displayed.

Figure 4:
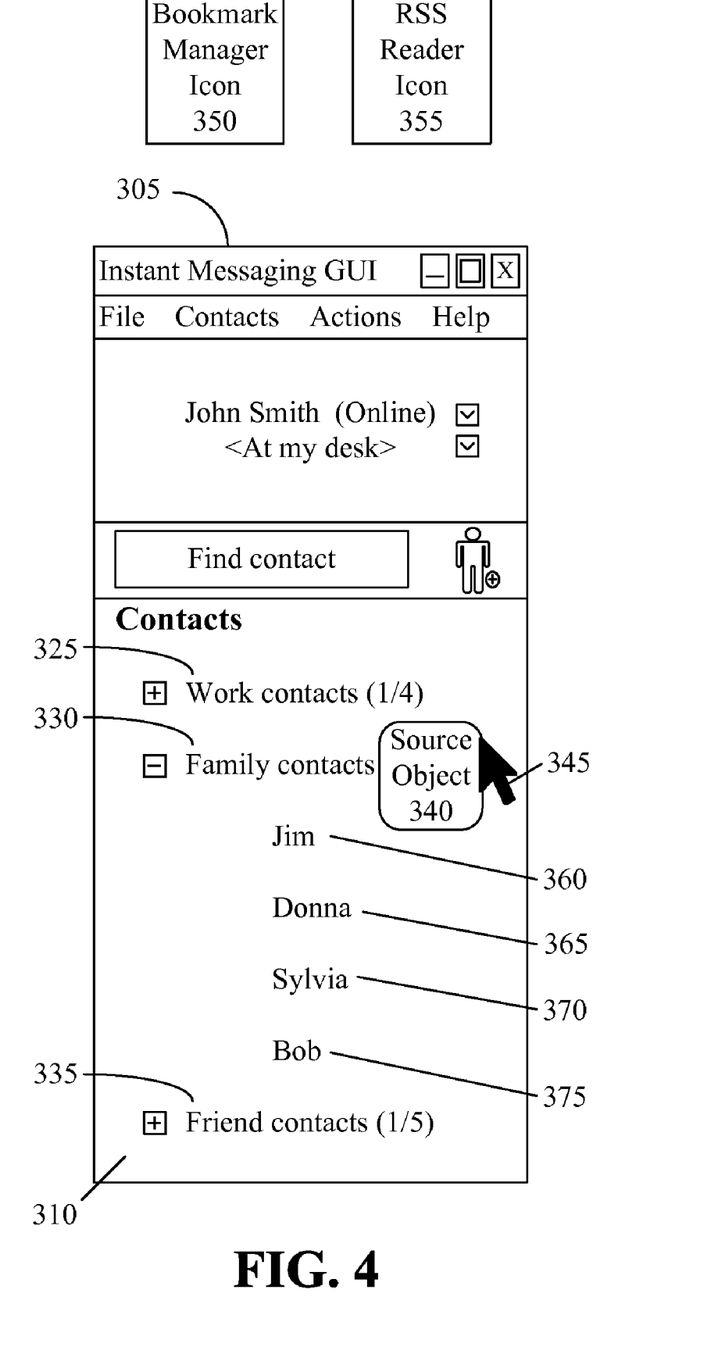
FIG. 4 is a fourth pictorial view illustrating a technique for selecting an event handler in accordance with another embodiment of the present invention.

FIG. 4 is a fourth pictorial view illustrating a technique for selecting an event handler in accordance with another embodiment of the present invention. FIG. 4 represents a continuation of the drag and drop operation started in FIG. 3 with pointer 345 having dragged source object 340 into window 310. In this example, the user can traverse the hierarchical contact list by hovering over a particular node which can cause that node to expand or collapse. In this sense, hovering over a node for a minimum and predetermined amount of time can select that node. Here, pointer 345, while dragging source object 340, can hover over node 330 for a predetermined amount of time, thereby causing node 330 to expand. Expansion of node 330 reveals four child nodes 360, 365, 370, and 375. In this example, since a contact is a drop target, child nodes 360-370 are drop targets whereas nodes 325-330 are not.

While event handlers can be associated with particular file types, another classification of event handlers can be according to drop target type. For example, while contacts are described as being drop targets, other types of objects, e.g., a user's calendar, etc., also may be drop targets. In this respect, each different type of drop target can be associated with a particular set of event handlers. The set of event handlers for contacts may differ from those available for other types of drop targets. Further, each drop target may be associated with one or more event handlers by virtue of the type of each respective drop target. In another aspect, each drop target can be associated with one or more event handlers on an individual basis. Accordingly, when determining whether a drop target exists, the GUI 305 can query for several types of information such as the type of the source object and the type of the drop target that is available, selected, or displayed within a contacted window. Such information can be used to identify particular event handlers from those available within the host application and present icons for the identified event handlers.

Accordingly, GUI 305, with child nodes 360-375 being revealed, can determine that one or more drop targets do exist. GUI 305 can identify the type of the source object 340, e.g., a URL, and can identify the particular type of drop targets that are available. In this case, each drop target is a contact, e.g., nodes 360-375. Accordingly, the GUI 305 can identify event handlers of the host application that are available for contact type drop targets that also are capable of processing URL type source objects.

For purposes of illustration, it can be assumed that such a query has determined that two event handlers have been identified, e.g., a bookmark manager event handler and an RSS reader event handler. Accordingly, icons 350 and 355, corresponding to each respective identified event handler, can be dynamically displayed. A user can select one or both event handlers by dragging the source object 340 over one or both of icons 350 and/or 355 as may be desired before dropping the source object 340 onto one of nodes 360-375.

It should be appreciated that the selection of event handlers and the manner in which event handlers can be represented can be implemented in any of a variety of ways. In the preceding example, event handlers can be displayed when drop targets are revealed. In another example, when drop targets that are available within a window are of the same type, whether displayed or not, icons for the event handlers associated with those drop targets can be dynamically displayed without waiting to reveal the drop targets or selecting a particular drop target or parent node of a drop target. This may or may not be the case when revealed, or available, drop targets are not the same type and do not share a common set of event handlers.

In one embodiment, only event handlers that are common to each drop target can be displayed, while those event handlers that are not available to each drop target are not. In another embodiment, no event handlers can be displayed until the user selects a particular drop target, e.g., by hovering over the selected node during the drag and drop operation. For example, the identification of any event handlers can be delayed until a particular child node is selected during the drag and drop operation. In still another embodiment, each available event handler for any revealed drop targets, or for a selected parent node whether or not the child nodes are displayed, may be presented. In that case, the host application can notify the user in the event that an event handler is selected and the user subsequently drops the source object over a drop target for which the selected event handler is unavailable. It should be appreciated that in each case, the event handler(s) selected still are able to process the type of object being dragged.

In another embodiment, responsive to the source object 340 hovering over a parent node, such as node 330, only the child nodes that are drop targets can be displayed. Such an embodiment encompasses cases where not all child nodes of a parent node are drop targets. The GUI 305 can query for several types of information such as the type of the source object 340, the child nodes that are available, whether each child node is a drop target, the type of each child node, and the type of object each drop target can receive. Based upon the information determined from the query, the GUI 305 can differentiate between child nodes that are drop targets and those that are not. The GUI 305 can display only those child nodes, in this case nodes 360, 365, 370, and 375, of node 330 that are drop targets. Accordingly, nodes 360, 365, 370, and 375 are a subset of the total child nodes of node 330.

In another example, based on the information determined from the query, GUI 305 can determine which nodes that are drop targets can receive objects of the same type as the source object. Accordingly, the GUI 305 further can restrict the child nodes displayed to only those that are drop targets and that can receive objects of the same type as source object 340. For example, if source object 340 is an audio file and nodes 360-375 are displayed, nodes 360-375 can be assumed to be drop targets that can receive an audio file type object. Other child nodes of node 330 that are drop targets but which cannot receive an audio file are not displayed.

In another aspect, the particular icons that are displayed can change dynamically as the user selects, e.g., hovers over, different drop targets. As the user selects different drop targets, icons for event handlers can be presented for the selected drop target. For example, if a plurality of different types of drop targets are displayed, and each is associated with one or more event handlers that are not available to other drop targets, as the source object is moved to hover over a different drop target, the event handlers associated with that drop target, considering the type of the source object, can be presented.

Figure 5:
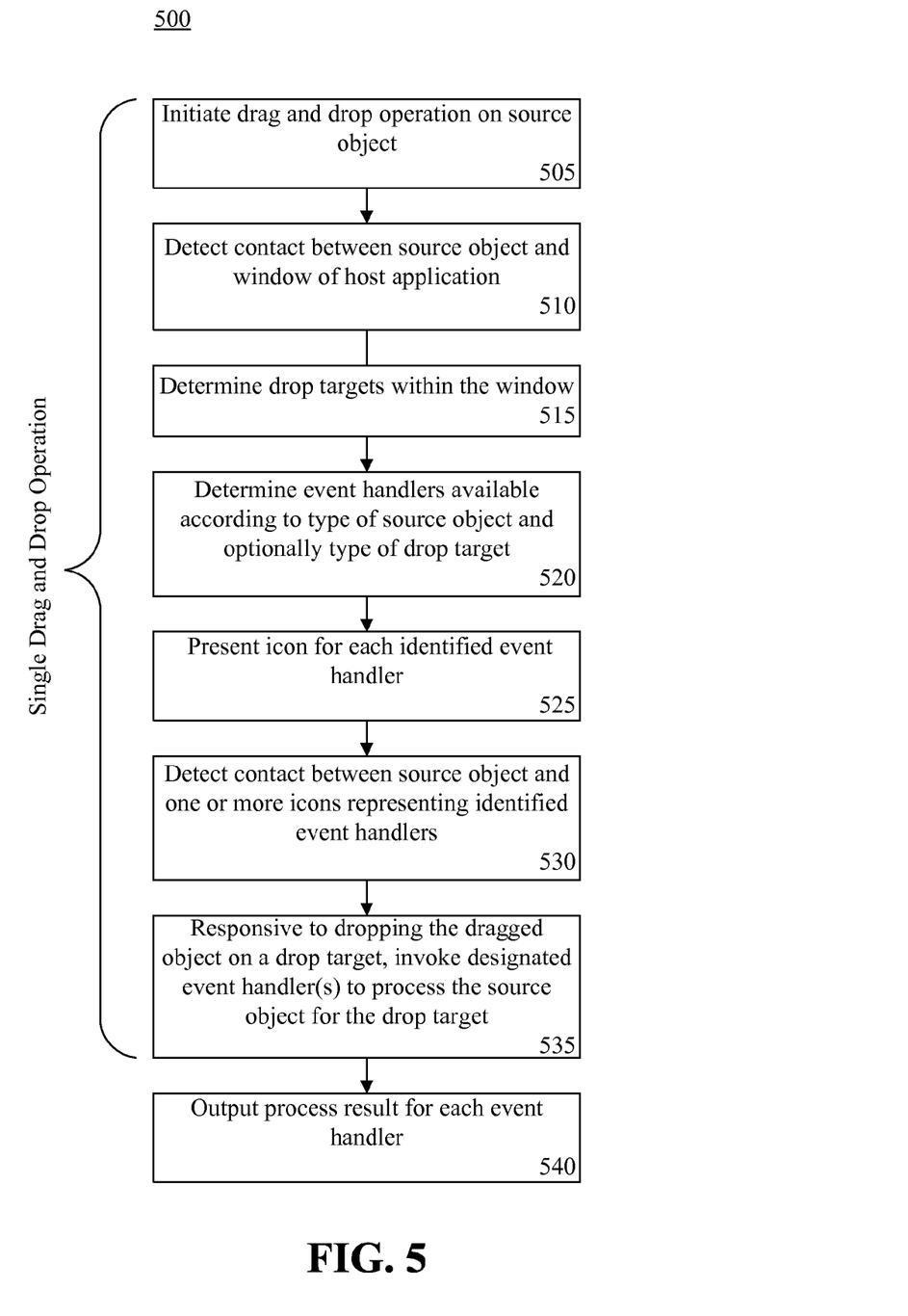
FIG. 5 is a flow chart illustrating a method of selecting an event handler in accordance with another embodiment of the present invention.

FIG. 5 is a flow chart illustrating a method 500 of selecting event handlers in accordance with another embodiment of the present invention. The method 500 implements a seamless drag and drop operation for selecting one or more event handlers to process a source object. The ability to incorporate the selection process within a drag and drop operation can be advantageous in applications where multiple event handlers available to act on a particular object type.

Accordingly, in step 505, a drag and drop operation can be initiated. A source object can be selected and dragged using a pointer. The source object can be dragged toward a GUI of a host application that includes a plurality of event handlers for processing objects of the same type as the source object. In step 510, contact between the source object a window within the GUI can be detected.

In step 515, any drop targets within the window can be identified. As noted, the type of the drop targets also can be determined. In step 520, the event handlers associated with the identified drop targets that are able to process objects of the same type as the source object can be identified. As noted, if no drop targets are displayed, the user can navigate a hierarchical list to reveal drop targets, e.g., using a hover-type of selection mechanism, as described herein.

In step 525, an icon for each event handler identified in step 520 can be dynamically displayed. In step 530, contact between the source object and one or more of the displayed icons representing event handlers can be detected. In one embodiment, once contact is detected between the source object and an icon, the appearance of the contacted icon can be changed to indicate the contact and the designation of the event handler associated with the contacted icon to process the source object. In another embodiment, the appearance of the source object can be changed to indicate the designation of one or more event handlers for processing the source object. The appearance of the source object can be altered also to indicate a number of event handlers that have been designated or that more than one event handler has been designated. It should be appreciated that the appearance of the source object, a contacted icon, or both may be altered to indicate the designation of an event handler.

In step 535, responsive to dropping the source object on the drop target, each event handler selected, or designated via the contact detected in step 530, can be invoked to process the source object for the drop target. In step 540, a process result for each event handler can be output. As used herein, "output" or "outputting" can include, but is not limited to, storing data in memory, e.g., writing to a file, writing to a user display or other output device, e.g., playing audible notifications, sending or transmitting to another system, exporting, or the like.

For example, the user may wish to alert a co-worker to a deadline of a project that both users share. The user can select a source object indicating the deadline, e.g., a task or calendar object, drag the source object over an icon for a calendar management event handler and an icon for a task management event handler, and drop the source object on a node representing the co-worker in the contact list of an IM application GUI. Upon dropping the source object, an entry can be added to the calendar of the co-worker and a task can be added to a task list of the co-worker. Accordingly, the function that is performed by each event handler is performed with reference to both the source object and the drop target.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of selecting event handlers comprising:
    initiating a drag and drop operation for a source object;
    responsive to detecting contact between the source object and a window of a graphical user interface (GUI), displaying a plurality of icons, wherein each icon represents an event handler for a drop target within the window;
    detecting contact between the source object and at least one of the plurality of icons while dragging the object;
    designating each event handler associated with a contacted icon to process the source object; and
    responsive to dropping the source object onto the drop target, invoking each designated event handler to process the source object for the drop target, wherein each designated event handler outputs a process result.

2. The computer-implemented method of claim 1, further comprising responsive to detecting contact between the source object and the window, determining whether the window contains at least one drop target.

3. The computer-implemented method of claim 2, further comprising determining whether a plurality of event handlers is associated with the drop target.

4. The computer-implemented method of claim 3, further comprising determining whether each event handler associated with the drop target processes an object of a same type as the source object.

5. The computer-implemented method of claim 1, further comprising selecting only event handlers associated with the drop target that also process objects having a same type as the source object, wherein only icons corresponding to the selected event handlers are displayed.

6. The computer-implemented method of claim 1, wherein the window comprises a parent node and at least one child node, the computer-implemented method further comprising, responsive to detecting contact between the source object and a child node, determining that the child node is the drop target and displaying the plurality of icons, wherein each icon of the plurality of icons represents an event handler of the child node for processing the source object.

7. The computer-implemented method of claim 1, wherein detecting contact between the source object and at least one of the plurality of icons further comprises changing an appearance of the icon to indicate the event handler associated with the icon has been designated to process the source object responsive to detecting contact between the source object and the icon.

8. The computer-implemented method of claim 1, wherein designating each event handler associated with a contacted icon further comprises, responsive to the event handler being designated, changing an appearance of the source object to indicate an event handler designation for the source object.

9. The computer-implemented method of claim 1, wherein displaying the plurality of icons further comprises:
    dynamically presenting the plurality of icons in a display; and
    responsive to dropping the source object, removing the plurality of icons from the display.

10. A computer-implemented method of selecting event handlers comprising:
    initiating a drag and drop operation by dragging a source object and contacting a window of a graphical user interface (GUI) comprising a parent node that is not a drop target;
    responsive to selecting the parent node in the window during the drag and drop operation, expanding the parent node to reveal at least one child node that is a drop target;
    identifying a plurality of event handlers associated with each child node that process objects of a same type as the source object;
    presenting icons associated with each identified event handler;
    responsive to detecting contact between the source object and at least one of the plurality of icons, designating each event handler associated with a contacted icon to process the source object; and
    responsive to dropping the source object onto the child node, invoking each designated event handler to process the source object for the child node, wherein each designated event handler outputs a process result.

11. The computer-implemented method of claim 10, wherein identifying a plurality of event handlers comprises identifying only event handlers that are common to each child node.

12. The computer-implemented method of claim 10, wherein at least one identified event handler is not common to at least one of the child nodes, wherein identifying a plurality of event handlers comprises:
    delaying identification of any event handlers until a particular child node is selected during the drag and drop operation;
    detecting contact between the source object and one of the child nodes; and
    identifying a plurality of event handlers associated with the contacted child node that process objects of a same type as the source object.

13. A computer program product comprising a computer usable storage medium having stored therein computer-usable program code for selecting event handlers, the computer-usable program code, which when executed by a computer hardware system, causes the computer hardware system to perform:
    initiating a drag and drop operation for a source object;
    responsive to detecting contact between the source object and a window of a graphical user interface (GUI), displaying a plurality of icons, wherein each icon represents an event handler for a drop target within the window;
    detecting contact between the source object and at least one of the plurality of icons while dragging the object;
    designating each event handler associated with a contacted icon to process the source object; and
    responsive to dropping the source object onto the drop target, invoking each designated event handler to process the source object for the drop target, wherein each designated event handler outputs a process result.

14. The computer program product of claim 13, wherein the computer-usable program code further causes the computer hardware system to perform
responsive to detecting contact between the source object and the window, determining whether the window contains at least one drop target.

15. The computer program product of claim 14, wherein the computer-usable program code further causes the computer hardware system to perform determines whether a plurality of event handlers is associated with the drop target.

16. The computer program product of claim 15, wherein the computer-usable program code further causes the computer hardware system to perform
determining whether each event handler associated with the drop target processes an object of a same type as the source object.

17. The computer program product of claim 13, wherein the computer-usable program code further causes the computer hardware system to perform
selecting only event handlers associated with the drop target that also process objects having a same type as the source object, wherein only icons corresponding to the selected event handlers are displayed.

18. The computer program product of claim 13, wherein the window comprises a parent node and at least one child node,
the computer-usable program code further causes the computer hardware system to perform:
responsive to detecting contact between the source object and a child node,
determining that the child node is the drop target and displaying the plurality of icons, and
each icon of the plurality of icons represents an event handler of the child node for processing the source object.

19. The computer program product of claim 13, wherein the computer-usable program code further causes the computer hardware system to perform
changing an appearance of the icon to indicate the event handler associated with the icon has been designated to process the source object responsive to detecting contact between the source object and the icon.

20. The computer program product of claim 13, wherein the computer-usable program code further causes the computer hardware system to perform
responsive to the event handler being designated, changing an appearance of the source object to indicate an event handler designation for the source object.

* * * * *